United States Patent [19]

Hitosugi

[11] Patent Number: 5,170,636
[45] Date of Patent: Dec. 15, 1992

[54] HEAT EXCHANGER

[75] Inventor: Toshiaki Hitosugi, Numazu, Japan

[73] Assignee: Kabushiki Kaisha Toshiba, Kawasaki, Japan

[21] Appl. No.: 690,266

[22] Filed: Apr. 24, 1991

[30] Foreign Application Priority Data

Apr. 24, 1990 [JP] Japan ................... 2-106376

[51] Int. Cl.$^5$ .............................. F25B 7/00
[52] U.S. Cl. .................... 62/175; 62/228.4; 62/510; 417/3; 236/1 EA
[58] Field of Search ............ 62/175, 228.4, 510; 236/1 EA; 417/3, 14, 29, 286, 287, 288

[56] References Cited

U.S. PATENT DOCUMENTS

| 4,502,842 | 3/1985 | Currier | 417/8 |
| 4,526,513 | 7/1985 | Bogel | 417/5 |
| 4,787,211 | 11/1988 | Shaw | 62/175 |

FOREIGN PATENT DOCUMENTS 1-193089 8/1989 Japan .
1-2447786 10/1989 Japan .
1-291064 11/1989 Japan .
1516379 7/1978 United Kingdom .

Primary Examiner—John Sollecito
Attorney, Agent, or Firm—Cushman, Darby & Cushman

[57] ABSTRACT

A heat exchanger includes a rotary compressor having two compression pumps and a motor for driving the compressor pumps, a condenser connected to the rotary compressor, a regulator connected to the condenser and with an evaporator connected to the regulator. An electric power is supplied from an inverter circuit to the motor of the rotary compressor. The output frequency of the inverter circuit is controlled by a frequency controlling device according to a heat load of a heat exchange circuit subjected. The rotary compressor is operated according to a parallel operation pattern in which the two compression pumps are actuated or a single operation pattern in which a single compression pump is actuated. Either one of the two operation patterns is selected by a selecting device according to the operational condition of the heat exchanger. The switching between the single operation and the parallel operation is performed by a switching device according to the output signal of the selecting device.

8 Claims, 14 Drawing Sheets

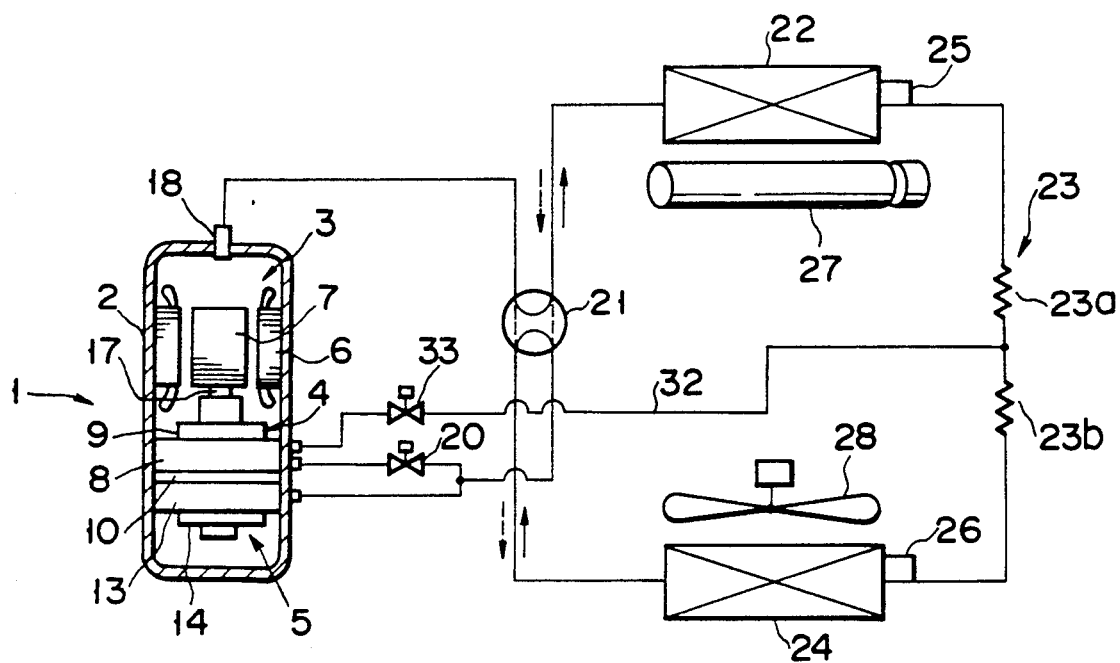
F I G. 1
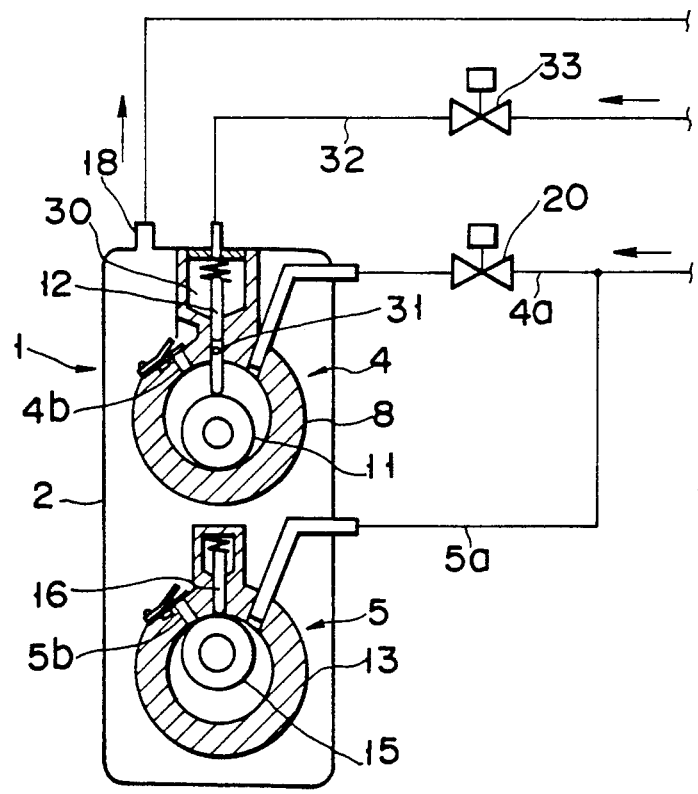
F I G. 2

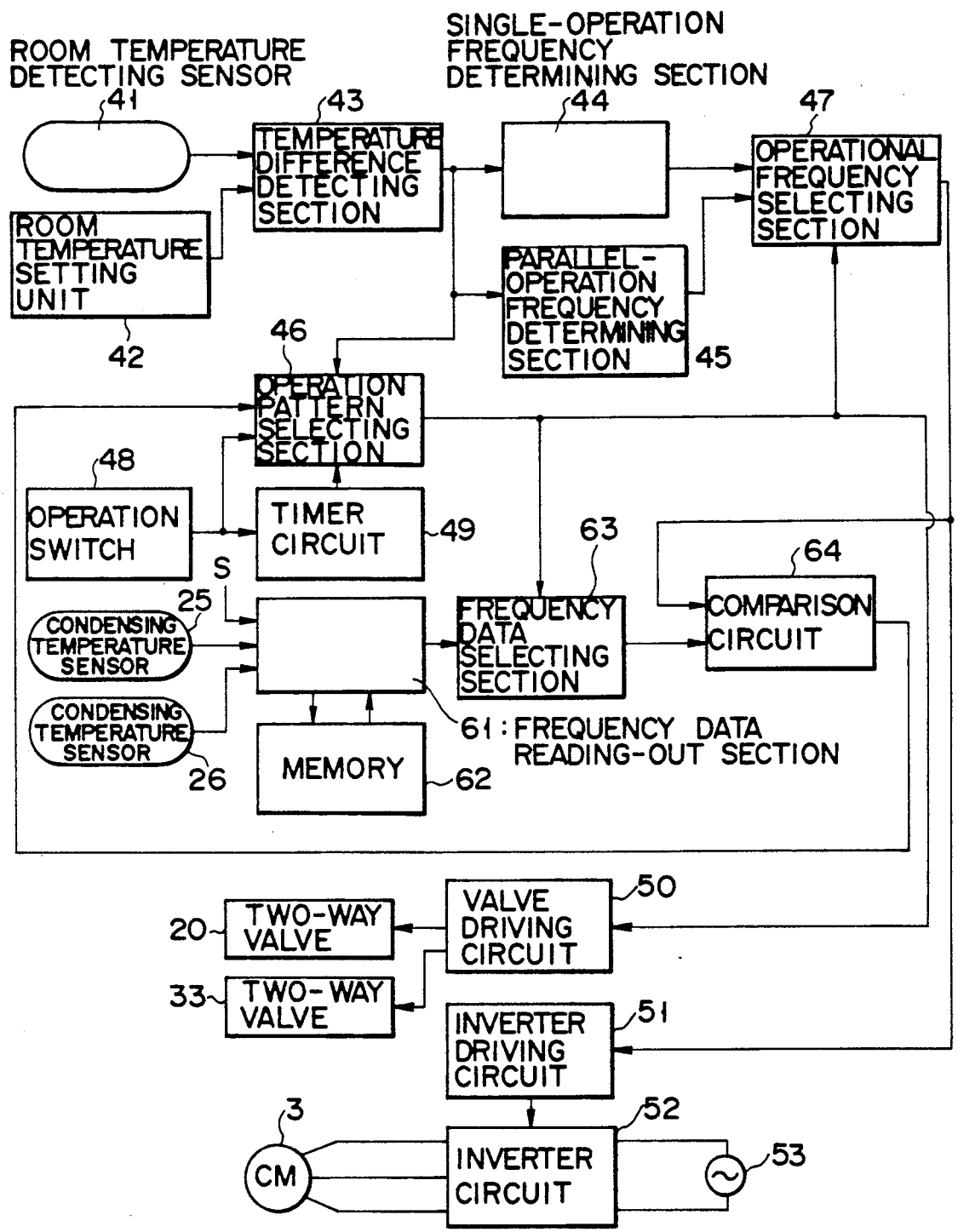
F I G. 3

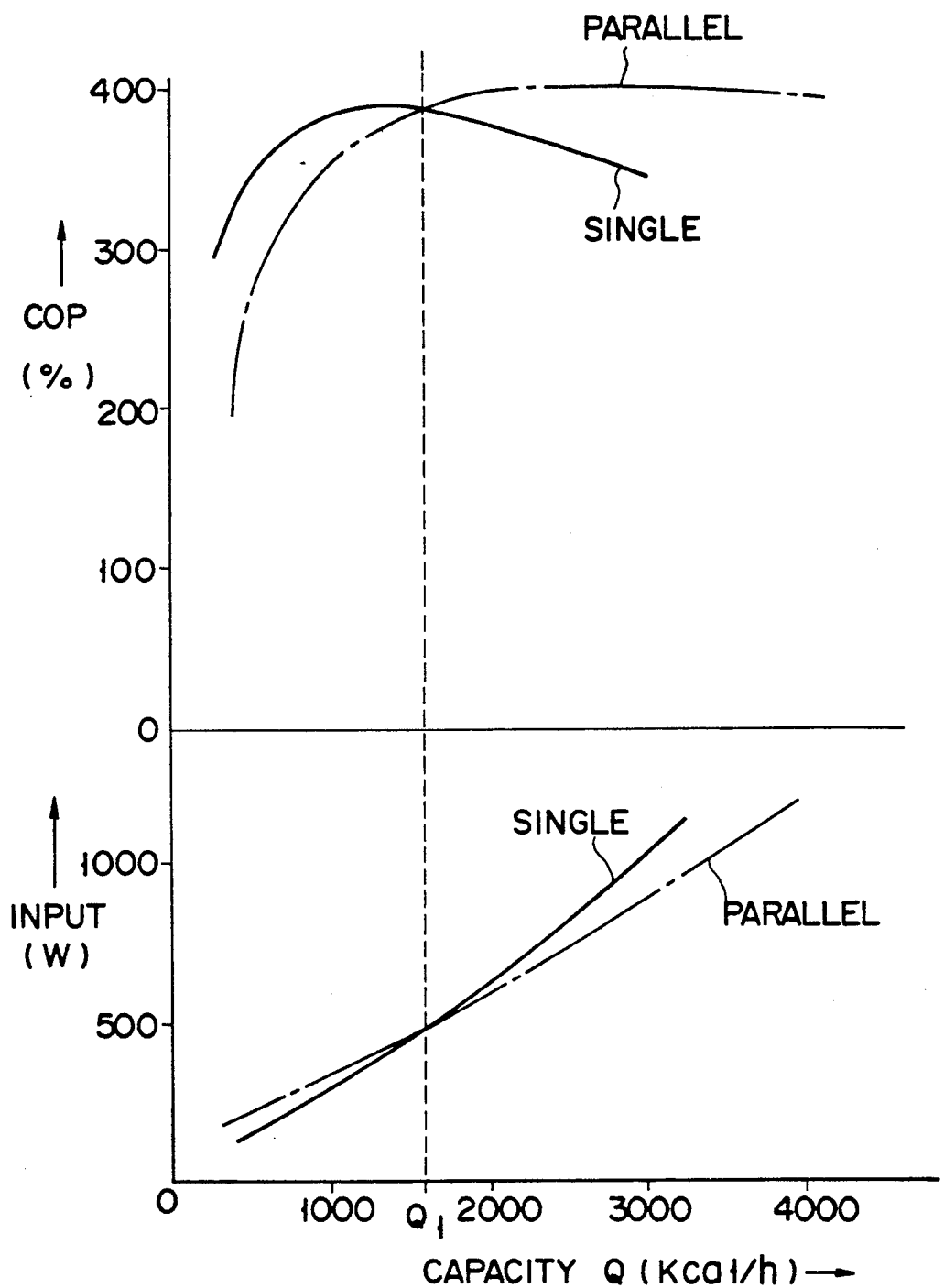
F I G. 6

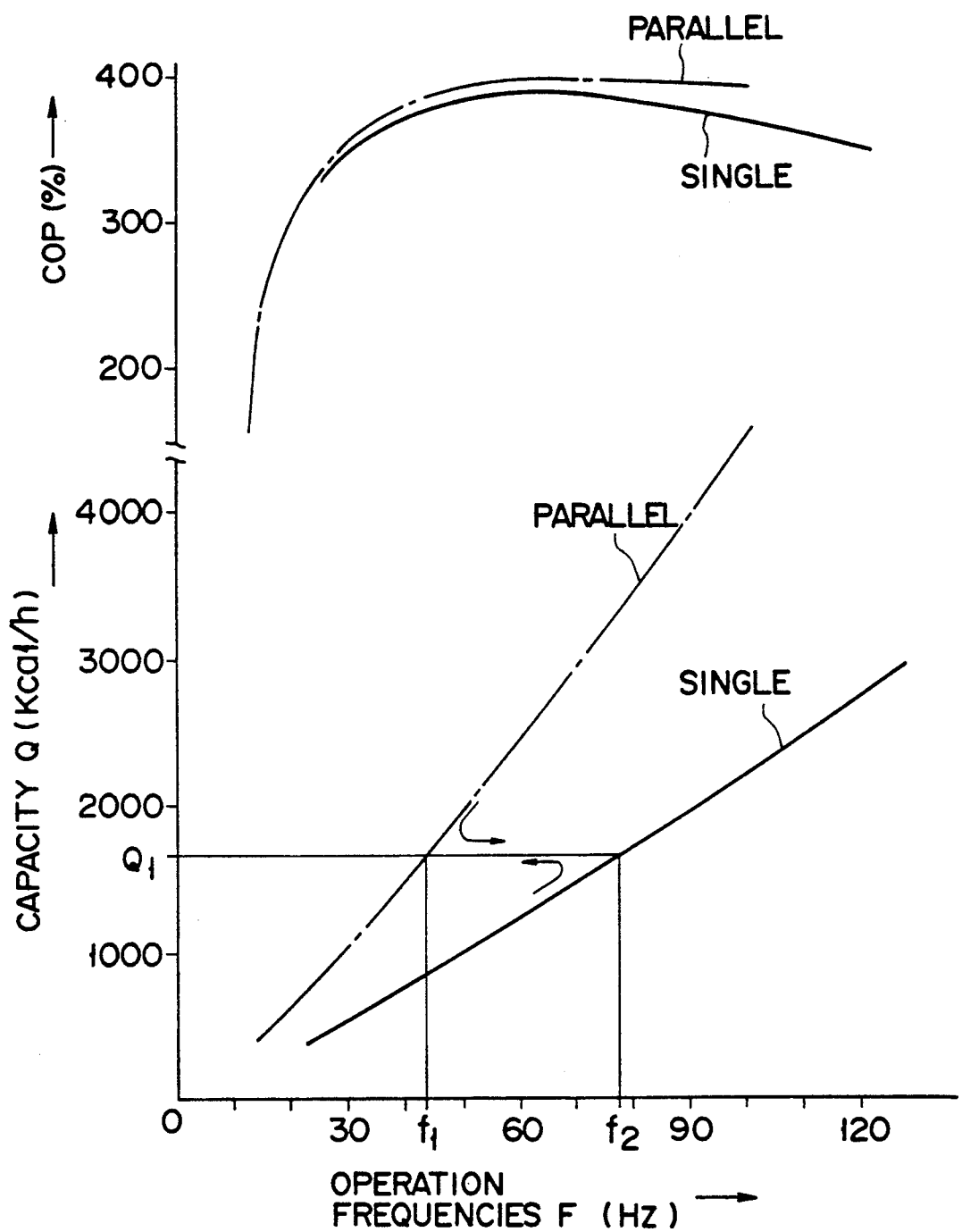
F I G. 7

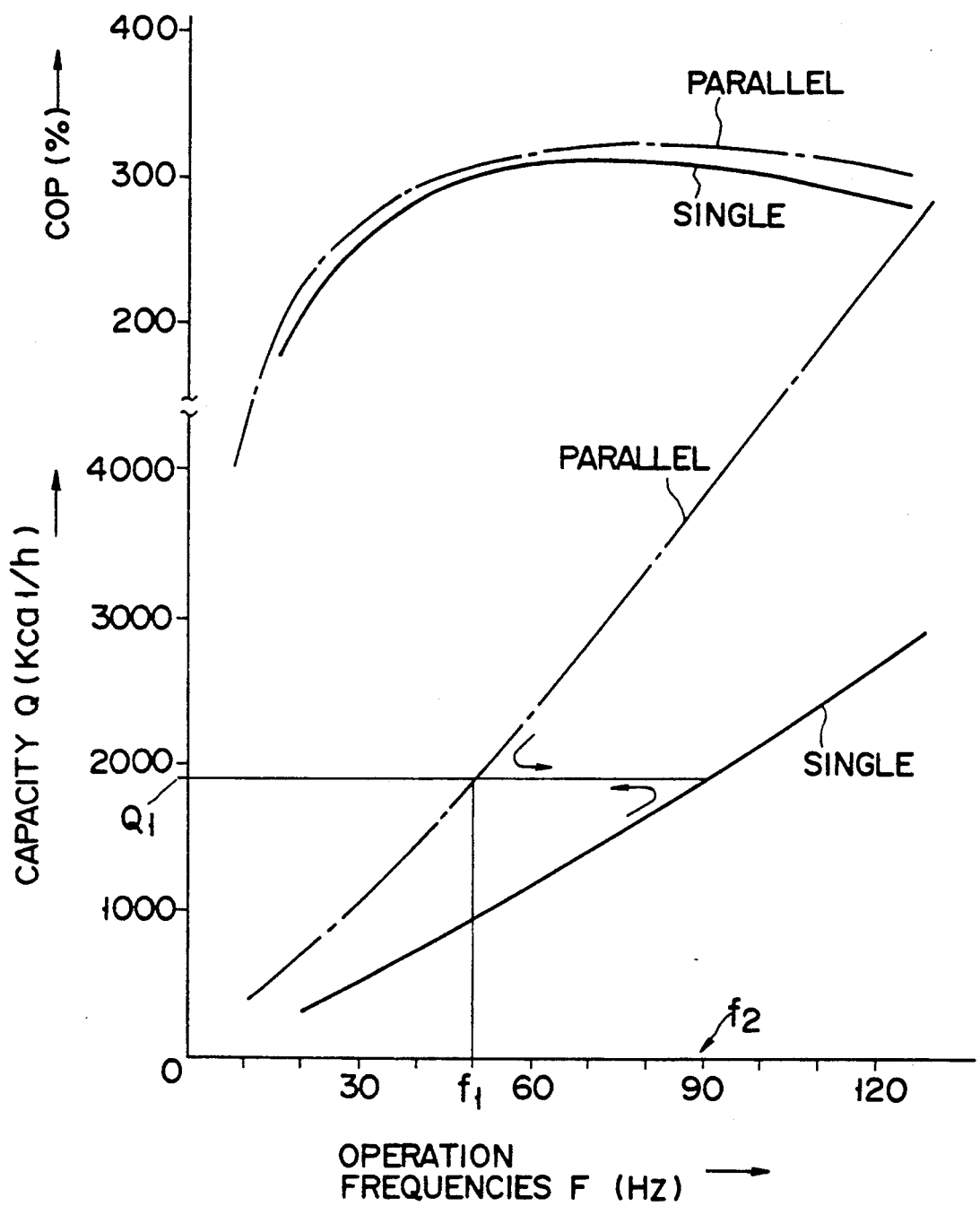
F I G. 9

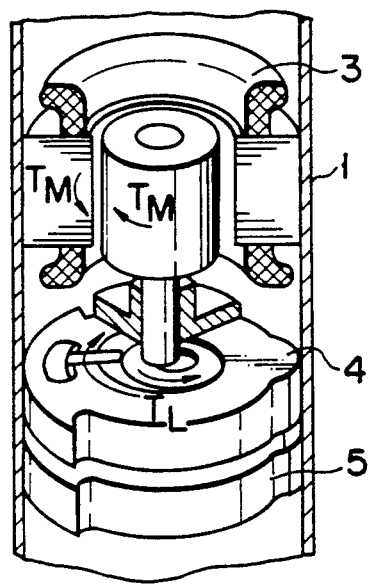
F I G. 10
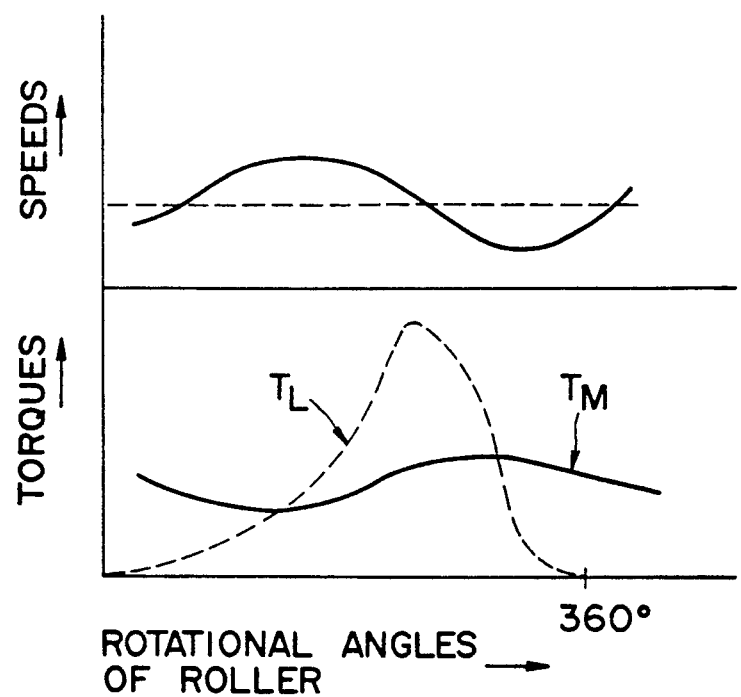
F I G. 11

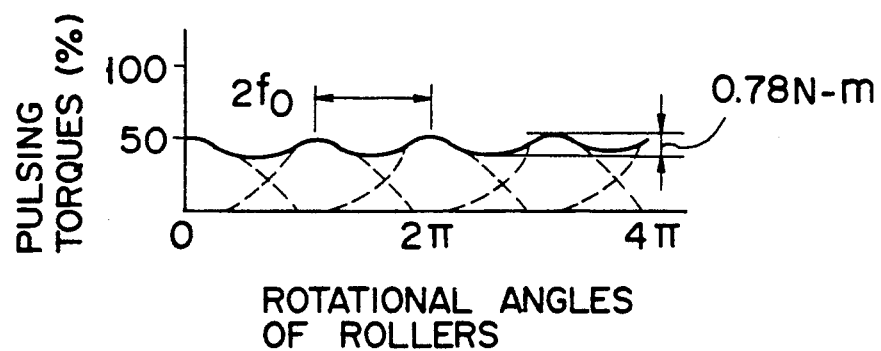
F I G. 12
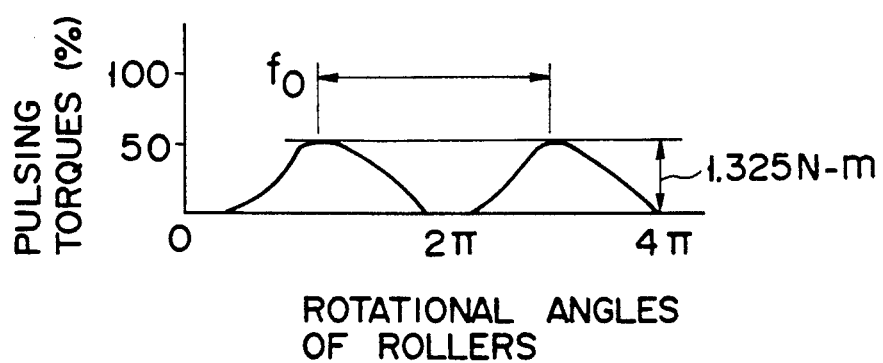
F I G. 13

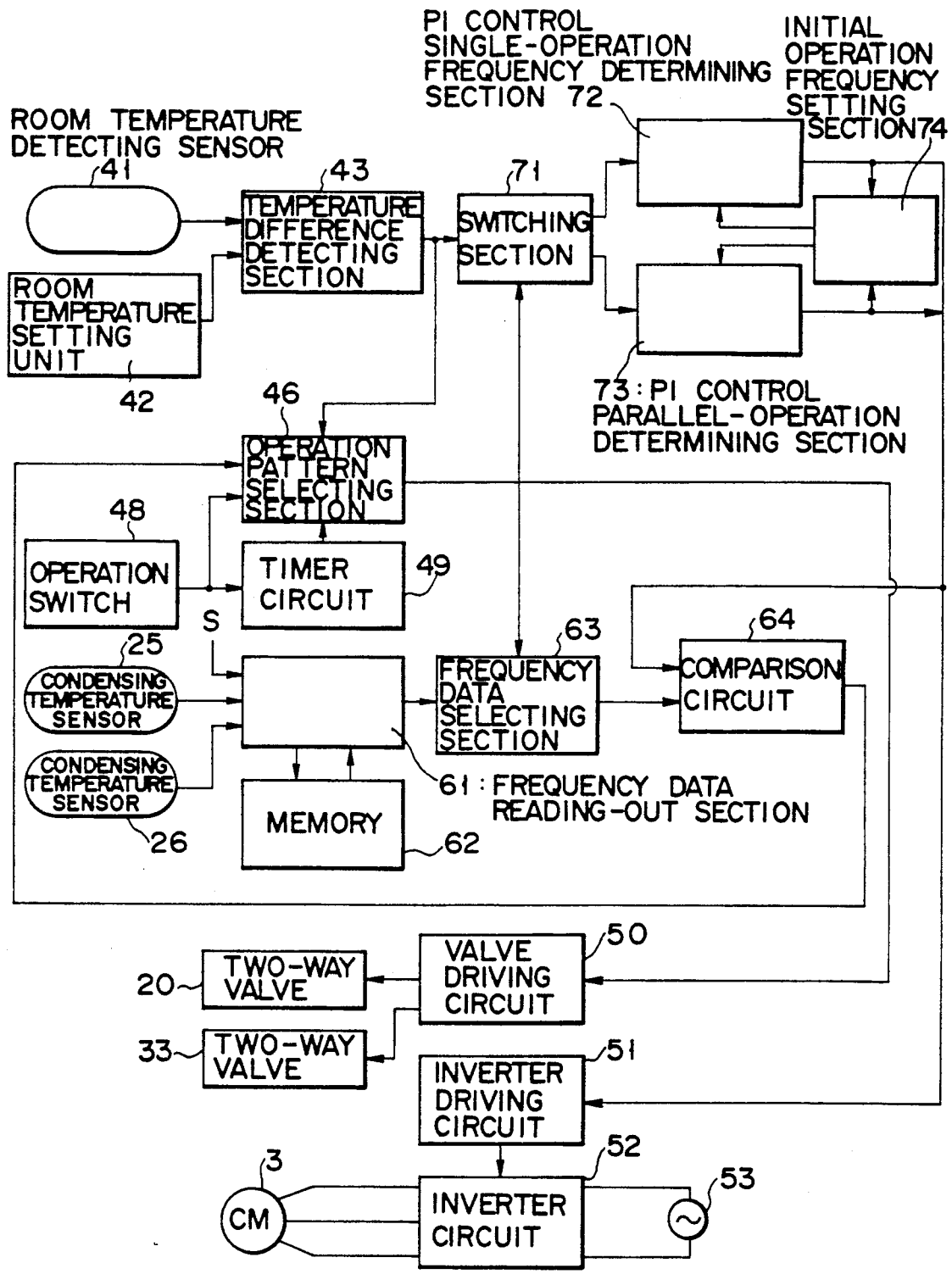
F I G. 18

HEAT EXCHANGER

BACKGROUND OF THE INVENTION

1. Field of the Invention

This invention relates to a having a twin-cylinder type rotary compressor.

2. Description of the Related Art

There have been known air conditioners, each of which comprises a twin-cylinder type rotary compressor having a motor and two compression pumps and a cooling cycle system including a condenser, a decompressor and an evaporator all connected to the rotary compressor. One type of such air conditioners is disclosed in Japanese Laid-open Patent Application Hei 2-193089.

Each of the two compression motors of the twin-cylinder type rotary compressor in the disclosed air conditioner is set such that it has the cylinder operation volume half as much as that of the compressor pump of a single-cylinder type rotary compressor having a single compression pump.

To each compression pump is connected an electromagnetic two-way valve which effects the switching between the operation of a single compression pump and the parallel operation of two compression pumps. The motor of the rotary compressor is provided with an inverter circuit, the output frequencies of which are controlled according to the loads of the air conditioner. More specifically, the output frequencies are controlled such that both compressor pumps are operated in a parallel manner at a high load, and only a single compressor pump is operated at a low load.

The parallel operation of compression pumps provides a higher operation efficiency of the rotary compressor (the operation efficiency of the rotary compressor being hereinafter referred to as the n"COP") at an output higher than a common value at which the output curves of the parallel-operated compressor pumps and the singly operated compressor pump meet, while the operation of a single compression pump exhibits a higher COP at a lower output than the common output value. This characteristic of the rotary compressor improves the energy consumption efficiency of the air conditioner (hereinafter referred to as the "EER").

In the conventional air conditioner, the switching between the parallel operation and the single operation is carried out by assuming that the common output value of the output of the parallel-operated compressor pumps and the singly operated compressor pump or their COPs are always constant regardless of the loads applied to the air conditioner. However, the common values of the parallel-operated COP and the singly operated COP vary due to the loads applied to the air conditioner, making it unable to always obtain the optimum COP and hindering the EER from being fully improved.

SUMMARY OF THE INVENTION

The object of this invention is to provide a heat exchanger in which the switching between the parallel operation of both compressor pumps and the operation of a single compression pump for a twin-cylinder type rotary compressor can be carried out always at the best condition of the operation efficiency of the rotary compressor (COP) thereby improving the energy consumption efficiency of the heat changer (EER).

In order to attain the object, a heat exchanger according to this invention comprises a heat exchange circuit including a rotary compressor having two compression pumps and a motor for driving the compression pumps, a condenser connected to the rotary compressor, a regulator connected to the condenser, an evaporator connected to the regulator an inverter circuit for supplying an electric power to the motor of the rotary compressor; frequency controlling means for controlling output frequencies of the inverter circuit in response to heat loads of the heat exchange circuit subjected; selecting means for selecting a higher one from operation efficiencies of the two compression pumps in parallel operation and of one of the two compression pumps in single operation; and switching means for carrying out switching between the parallel operation and the single operation in response to output signals of the selecting means.

In this invention, the rotary compressor is driven by the inverter circuit such that the output frequency is controlled in accordance with the load of the air conditioner. In this case, a higher operation pattern is selected from the parallel operation of the compression pumps and the single operation of a single compression pump, and the rotary compressor is operated at this selected operation pattern.

Additional objects and advantages of the invention will be set forth in the description which follows and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

This invention will now be fully understood from the following detailed description with reference to the accompanying drawings in which:

FIG. 1 is a general view of a heat exchanger according to a first embodiment of this invention;

FIG. 2 is a diagram of the piping of a twin-cylinder type rotary compressor of FIG. 1;

FIG. 3 is a block diagram of the control circuit of the heat exchanger of the first embodiment;

FIGS. 6 and 7 are graphs showing the A load conditions in the first embodiment;

FIGS. 8 and 9 are graphs showing the B load conditions in the first embodiment;

FIG. 10 is a cross-sectional perspective view illustrating the interior of the twin-cylinder type rotary compressor in FIG. 1;

FIGS. 11 to 14 are graphs explaining the characteristics of the motor of the twin-cylinder type rotary compressor of the first embodiment;

FIG. 18 is a block diagram showing the structure of the control circuit of a heat exchanger related to a second embodiment of this invention.

DETAILED DESCRIPTION OF THE PREFERRED EMBODIMENTS

Figure 4:
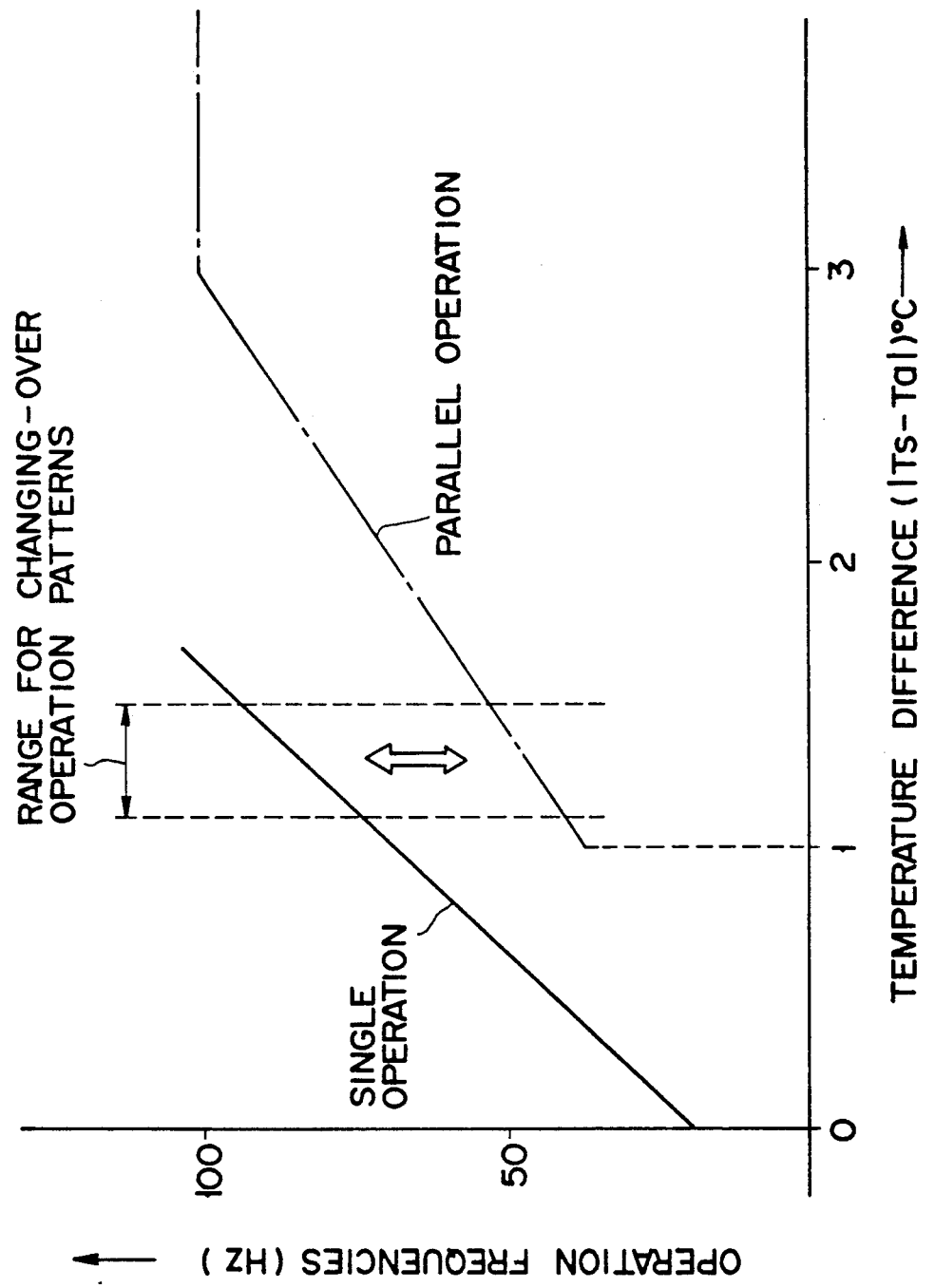
FIG. 4 is a graph showing the relationship between the temperature differences and the operation frequencies of the first embodiment.

Embodiments of this invention will now be described with reference to the drawings.

A first embodiment of this invention is shown in FIGS. 1 and 2. A twin-cylinder type rotary compressor designated at 1 has a motor 3 which is mounted in the upper stage in a sealed case 2 and two compression pumps 4 and 5 connected in series with each other in the lower stage in the sealed case 2.

The motor 3 comprises a stator 6 and a rotor 7. The compression pump 4 includes a main bearing 9 and an intermediate partition plate 10 which sandwich a cylinder 8. An eccentrically rotatable roller 11 and a blade 12 are placed in a space surrounded by the cylinder 8, the main bearing 9 and the intermediate partition plate 10. The compression pump 5 has a cylinder 13 similar to the cylinder 8 of the compression pump 4 and provided on the intermediate partition plate 10, and a sub-bearing 14 which, together with the intermediate partition plate 10, sandwiches the cylinder 13. An eccentrically rotatable roller 15 and a blade 16 are provided in a space surrounded by the cylinder 13, the sub-bearing 14 and the intermediate partition plate 10. The rollers 11 and 15 are arranged symmetrically with each other such that they are out-of-phase by 180°.

The operational volume of each of the compression pumps 4 and 5 is set to a volume of 50% of, or half as much as, a single cylinder type rotary compressor having a compression pump. The rollers 11 and 15 of the compression pumps 4 and 5 are connected to the rotor 7 of the motor 3 by means of a shaft 17 such that the compression pumps 4 and 5 are simultaneously driven by the rotation of the motor 3. To the compression pumps 4 and 5 are connected suction pipes 4a and 5a which are joined together at the exterior of the sealed case 2. The compression pumps 4 and 5 have discharge ports 4b and 5b which open to the interior of the sealed case 2 and communicate with a discharge pipe 18 on the upper portion of the sealed case 2. The suction pipe 4a is provide with a electromagnetic two-way valve 20 which constitutes switching means for effecting the switching between the operation of a single compression motor (hereinafter referred to the "single operation") and the parallel operation of two compression motors (hereinafter referred to as the "parallel operation). Only the compression pump 5 is operated at the closed state of the two-way valve 20 in which only the compression pump 5 performs compression, while both compression pumps 4 and 5 are actuated at the opened state thereof in which both compression pumps 4 and 5 effect compression. An external heat exchanger 22 is connected to the discharge pipe 18 by means of a four-way valve 21. To the heat exchanger 22 are connected a regulator 23 comprising two capillary tubes 23a and 23b and an internal heat exchanger 24 which is further connected to the suction pipes 4a and 5a by means of the four-way valve 21. The heat exchangers 22 and 24, the regulator 23 and the four-way valve 21 and their related parts constitute a heat-pump type cooling cycle system.

In the cooling operation, the four-way valve 21 is set in an inoperative state whereby the cooling cycle operation is performed by making the coolant flow in the direction indicated by a solid-line arrow in FIG. 1 so as to actuate the external heat exchanger 22 as a condenser and the internal heat exchanger 24 as an evaporator. In the heating operation, on the other hand, the four-way valve is operated such that the heating cycle operation is carried out by letting the coolant flow in the broken-line arrow in FIG. 1 thereby to actuate the internal heat exchanger 24 as a condenser and the external heat exchanger 22 as an evaporator.

On the motor 3 of the twin-cylinder type rotary compressor 1, as shown in FIG. 3, is provided an inverter circuit 52 for supplying an electric driving force, the output frequencies of which circuit are controlled in accordance with the loads of the air conditioner. The control of the output frequencies of the inverter circuit 52 effects the parallel operation of the compression pumps 4 and 5 of the twin-cylinder type rotary compressor 1 at high loads, and carries out the single operation of the compression pump 5 at low loads.

As shown in FIG. 2, the compression pump 4 has a relatively large blade chamber 30 and a high pressure introducing hole 31 formed in the passage of the blade 12. When the blade 12 is lifted to a level higher than the ordinary stroke position, the hole 31 is opened and acts to introduce the coolant (gas) under a high pressure to the interior of the cylinder 8.

A bypass pipe 32 has one end connected to a tube portion of the decompressor 23 between the first and second capillary tubes 23a and 23b and the other end connected to the blade chamber 30. The bypass pipe 32 is provided with an electromagnetic two-way valve 33 which is opened at the single operation of the compression pump 5. More specifically, upon opening the two-way valve 33, part of the coolant which is not fully compressed (that is, the coolant under an intermediate pressure) passing through the first capillary tube 23a is conducted into the blade chamber 30. Since, in this state, the compressing operation is being continued in the cylinder 8 and a high pressure remains therein, the blade 12 is forcibly pushed toward the blade chamber 30 due to the difference between the high pressure in the cylinder 8 and the intermediate pressure in the blade chamber 30 such that the a high pressure introducing hole 31 is opened. The coolant under high pressure discharged in the sealed case 2 is introduced in the cylinder 8 via the high pressure introducing hole 31, and the pressure in the chamber of the cylinder 8 is elevated and is maintained in such a manner that the blade 12 is remained separated from the roller. Although the roller is continued to rotate, it does not effect compression, and makes so-called an idle rotation.

A condensing temperature sensor 25 is connected to the external heat exchanger 22, and another condensing temperature sensor 26 is connected to the internal heat exchanger 24. An external fan 27 is provided close to the external heat exchanger 22, and an internal fan 28 is disposed close to the internal heat exchanger 24. The motor 3 is of a brushless direct current type.

A control circuit of the heat exchanger according to this invention will now be explained.

In FIG. 3, a room temperature detecting sensor for detecting a room temperature Ta and a room temperature setting unit for setting the room temperature at a required value Ts are designated at 41 and 42, respectively. A temperature difference detecting section 43 detects the absolute value ($|Ts-Ta|$) of the difference between a to-be-set room temperature Ts set by the room temperature setting sensor 42 and a room temperature Ta detected by the room temperature detecting sensor 41. The detected result by the section 43 is sent to a single-operation frequency determining section 44, a parallel-operation frequency determining section 45 and an operation pattern selecting section 46.

When the temperature difference detected by the temperature difference detecting section 43 is relatively small, the single-operation frequency determining section 44 determines the operation frequency of the rotary compressor 1 which frequency is proportional to the temperature difference according to the single-operation characteristic which is indicated by a solid line in FIG. 4. On the other hand, when the temperature difference detected by the temperature detecting section 43 is relatively large, the parallel-operation frequency section 45 determines the operation frequency of the rotary compressor 1 which frequency is proportional to the temperature difference according to the parallel-operation characteristic which is indicated a one-dotted line in FIG. 4. The operation frequencies determined by the single-operation frequency determining section 44 and the parallel-operation frequency determining section 45 are sent to an operation frequency selecting section 47.

The operation pattern selecting section 46 is primarily used for determining, according to the comparative result obtained from a later-described comparison circuit 64, whether the single operation pattern or the parallel operation pattern should be selected. When an operation switch 48 is turned on (that is, after the operation is started), however, the selecting section 46 selects a operation pattern while a timer circuit 49 is operated for a constant time (for example, for five minutes). More specifically, the operation pattern selecting section 46 selects the parallel operation pattern when the temperature difference detected by the temperature difference detecting section 43 is 1° or more, and selects the single operation pattern when the temperature difference is less than 1°.

The data selected by the operation pattern selecting section 46 is sent to the operation frequency selecting section 47 and a valve driving circuit 50. The valve driving circuit 50 closes the two-way valve 20 and opens the two-way valve 33 when the operation pattern selecting section 46 selects the single operation pattern, and opens the two-way valve 20 and closes the two-way valve 33 when the section 46 selects the parallel operation pattern The operation frequency selecting section 47 selects an operation frequency in the single-operation frequency determining section 44 when the operation pattern selecting section 46 selects the single operation pattern, and selects an operation frequency in the parallel-operation frequency determining section 45 when the operation pattern selecting section 46 selects the parallel operation pattern. The selected data is delivered to an inverter driving circuit 51.

The inverter circuit 51 turns on and off the switching element of an inverter circuit 52 according to the operation frequencies selected by the operation frequency selecting section 47. The inverter circuit 52 commutates the voltage of a commercial AC electric source 53 and converts the commutated DC voltage to pulse voltages produced at predetermined time intervals at a predetermined frequency which is equal to the above-mentioned selected operation frequency but is out of phase by 120° therefrom to output the pulse voltages. The motor (brushless DC motor) 3 is connected to the output terminal of the inverter circuit 52.

The arrangement comprising the elements covering the room temperature sensor 41 to the inverter driving circuit 51 can control the output frequencies in the inverter circuit 52 in accordance with the loads of the air conditioner.

The condensing temperature sensors 25 and 26 provided on the condensers 22 and 24 are connected to a frequency data reading-out section 61 which is connected to a memory 62 and to which cooling and heating switching signals S are input. The frequency data reading-out section 61 has three functions, the first function being to determine whether the present operation is the cooling operation or the heating operation in response to the cooling and heating signal S, and the second function being to select the temperature Tc detected by the condensing temperature sensor 25 at the cooling operation and the temperature Tc detected by the condensing temperature sensor 26 at the heating operation, and the third function being to reading out, based on the selected detected temperature Tc, the datum operation frequency $f_1$ or $f_2$ in the memory 62.

Figure 5:
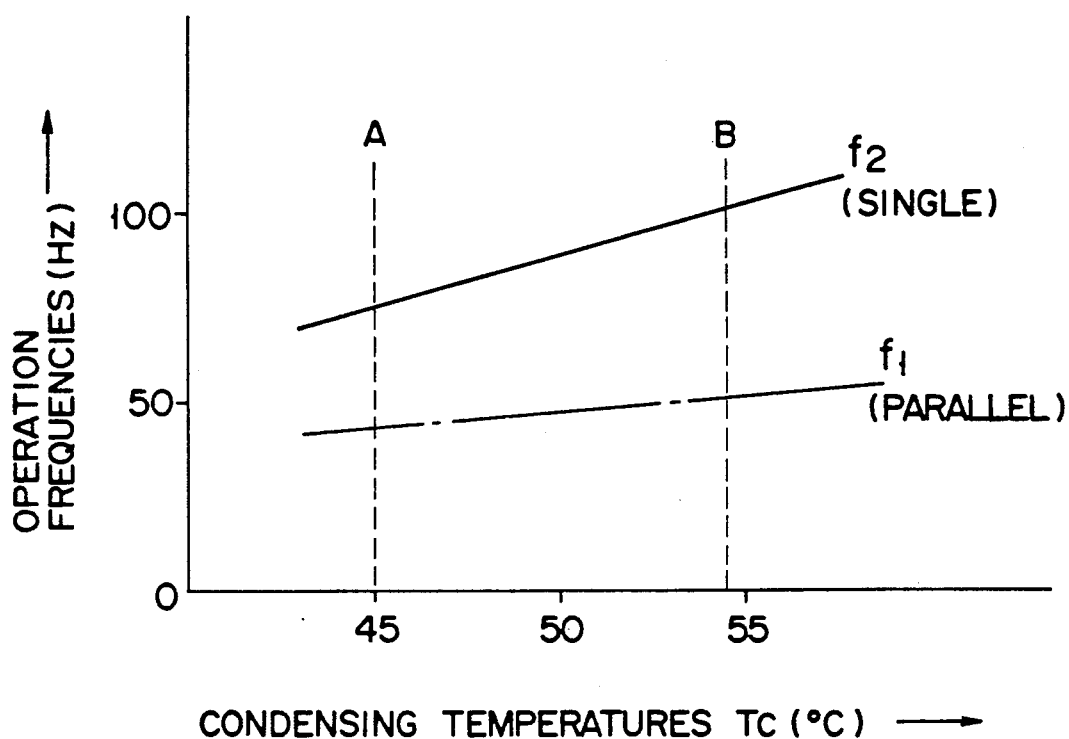
FIG. 5 is a graph showing the relationship between the condensing temperature and the operation frequencies of the first embodiment.

FIG. 5 shows the data memorized in the memory 62. The graph in FIG. 5 is drawn such that the total capacity of the compression pumps 4 and 5 in the parallel operation at the frequency of $f_1$ is equal to the capacity of the compression pump 5 in the single operation at the frequency of $f_2$ on the ordinate. The graph shows that both $f_1$ and $f_2$ are varied according to the condensing temperatures corresponding the loads.

The datum frequencies $f_1$ and $f_2$ read out from the frequency data reading-out section 61 are sent to the frequency data selecting section 63. The section 63 selects the datum frequency $f_2$ when the operation pattern selecting section 46 selects the single operation pattern, and selects the datum frequency $f_1$ when the operation pattern selecting section 46 selects the parallel operation pattern. The selected data is sent to the comparison circuit 64. The circuit 64 compares the operation frequency $f_1$ selected by the operation frequency selecting section 47 (the actual operation frequency F) with the datum operation frequency $f_1$ or $f_2$ selected by the frequency data selecting section 63 and the result from the comparison is delivered to the operation pattern selecting section 46.

The operation pattern selecting section 46 has three functions. The first function is exercised such that the section 46 selects a new single-operation pattern when the operation frequency F is lowered from $f_2$ at which the parallel operation is carried out to the datum operation frequency fl, that is, F becomes $f_1$. According to the second function, the section 46 selects a new parallel-operation pattern when the operation frequency F is increased from $f_1$ at which the single operation is performed to the datum operation frequency $f_2$, that is, F becomes $f_2$. The third function is carried out in such a way that the section 46 selects the operation pattern in response to the temperature difference detected by the temperature difference detecting section 43, regardless of the comparison result obtained from the comparison circuit 64, during the time duration (for example, five minutes) from the start of the operation by turning on the operation switch 48 to the end of the time set by the timer circuit 49.

The operation of the heat exchanger according to the first embodiment of this invention will now be explained.

Upon turning on the operation switch 48, the inverter circuit 52 is driven and its output operates the motor 3 to start the rotary compressor 1.

During the operation of the rotary compressor 1, the absolute value of the difference between the to-be-set room temperature Ts and the room temperature Ta, that is, |Ts−Ta| is detected, and the operation frequency for the single operation or the parallel operation is selected according to the detected result.

For the constant time as mentioned above (for example, five minutes) from the start of the operation, the operation pattern is selected in response to the detected temperature difference. For example, when the temperature difference is 1° or more, the parallel operation pattern is selected. For the temperature difference of less than 1°, the single operation pattern is selected. Since the load is normally large at the time of start of the operation, the parallel operation is usually selected.

Once the parallel operation is selected, the two-way valve 20 is opened and the two-way valve 33 is closed such that the parallel operation of the compression pumps 4 and 5 are performed. During the parallel operation, the inverter circuit 52 is controlled in accordance with the operation frequency in the parallel operation.

As the temperature difference becomes small due to the parallel operation, the operation frequency F of the rotary compressor 1 is rendered small. When the operation frequency F is lowered to the datum operation frequency $f_1$, that is, the frequency F agrees with $f_1$, a new operation pattern is selected. The datum operation frequency $f_1$ is selected in response to the temperature Tc detected by the condensing temperature sensor 25 (the temperature of the external heat exchanger 22 acting as a condenser) in the cooling operation, and in response to the temperature Tc detected by the condensing sensor 26 (the temperature of the internal heat exchanger 2 acting as a condenser) in the heating operation.

When the single operation pattern is selected in this way, the two-way valve 20 is closed and the two-way valve 33 is opened whereby the single operation of the compression pump 5 is carried out. Upon the changerover from the parallel operation to the single operation, the capacity Q of the rotary compressor 1 is not abruptly changed. During the simple operation, the output frequency of the inverter circuit 53 is controlled in accordance with the operation frequency in the single operation.

As the temperature difference is increased in the course of the simple operation, the operation frequency F is enhanced. When the operation frequency F is increased to the datum operation frequency $f_2$ to agree therewith, that is, F becomes equal to $f_2$, a new parallel operation pattern is selected. The datum operation frequency $f_2$ is selected in response to the temperature Tc detected by the condensing temperature sensor 25 (the temperature of the external heat exchanger 22 acting as a condenser) in the cooling operation, and in response to the temperature Tc detected by the condensing sensor 26 (the temperature of the internal heat exchanger 24 acting as a condenser) in the heating operation. When the parallel operation pattern is selected in this way, the two-way valve 20 is closed and the two-way valve 33 is opened whereby the single operation of the compression pump 5 is carried out. Upon the changerover from the single operation to the parallel operation, the capacity Q of the rotary compressor 1 is not abruptly changed, either.

FIG. 6 shows the relationship between the capacity Q of the rotary compressor 1 and the inputs (the electric power) which is input to the inverter circuit 52, and the relationship between the capacity Q of the rotary compressor 1 and the operation efficiencies (COP) thereof, obtained from experiments performed under the A load condition (high pressure Pd/low pressure Ps=16.6/5.4). FIG. 7 illustrates the relationship between the operation frequencies F and the capacitance Q of the rotary compressor 1 and the relationship between the operation frequencies F and the operation efficiencies of the rotary compressor 1 under the A load condition.

Figure 8:
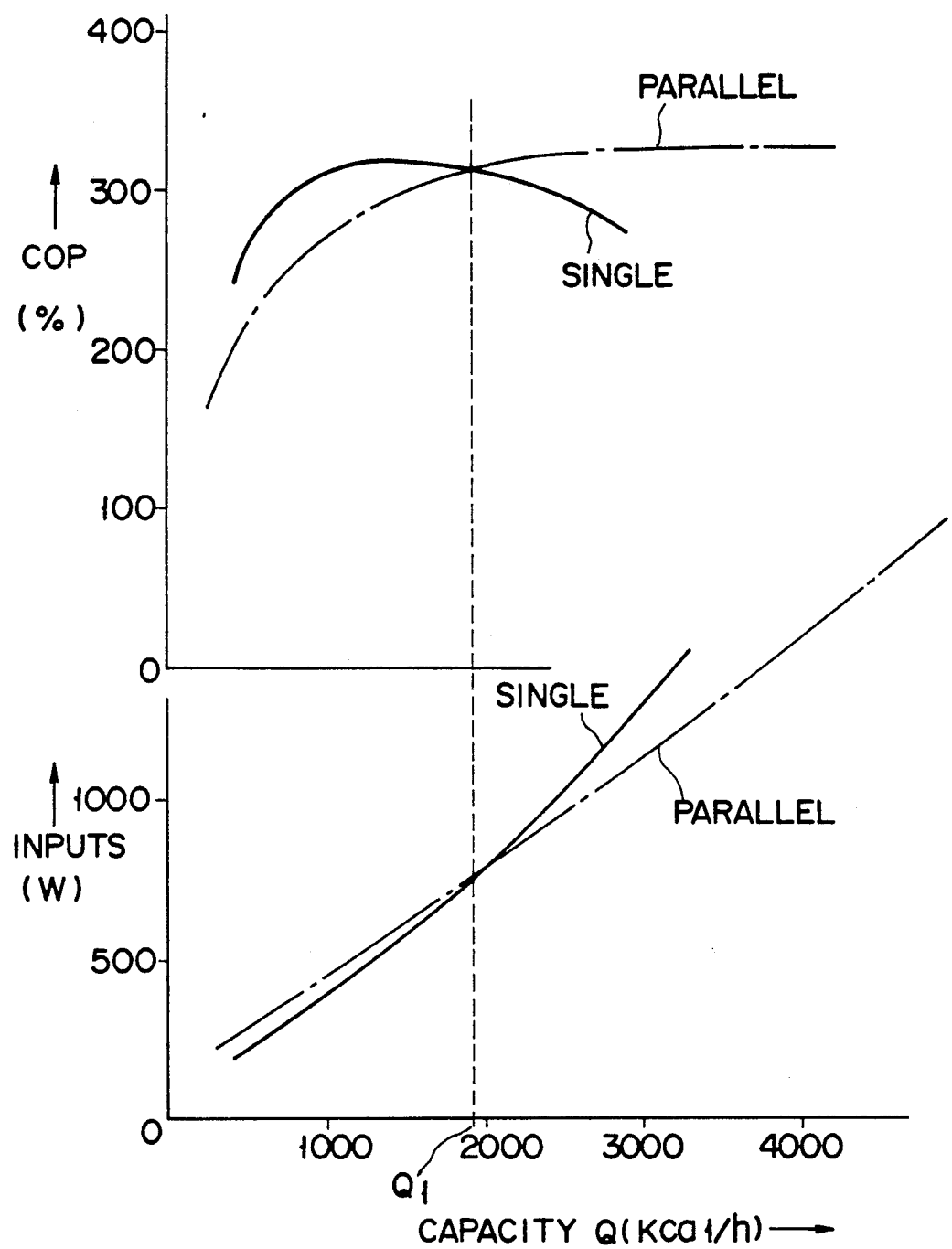

FIG. 8 indicates the relationship between the capacitance Q of the rotary compressor 1 and the inputs thereto and the relationship between the capacity of the rotary compressor 1 and the operation efficiencies (COPs) thereof, obtained from experiments performed under the B load condition (high pressure Pd/low pressure Ps=21.08/5.4). FIG. 9 shows the relationship between the operation frequencies F and the capacity Q of the rotary compressor 1 and the relationship between the operation frequencies F and the operation efficiencies (COP) of the rotary compressor 1 under the B load condition.

The capacities $Q_1$ at which the COPs in the parallel operation and the single operation are equal to each other are approximately 1,650 Kcal/h under the A load condition and approximately 1,900 Kcal/h under the B load condition. It is apparent that the COP under the B load condition is higher than the COP under the A load condition. It means that the larger the loads, the higher the $Q_1$'s. During the parallel operation, the operation frequencies $f_1$'s (the datum operation frequencies) at the corresponding $Q_1$'s are 43Hz under the A load condition and 50Hz under the B load condition. It follows that the $Q_1$ under the B load condition is higher than the $O_1$ under the A load condition. During the single operation, on the other hand, the operation frequencies $f_1$'s (the datum operation frequencies) at the corresponding $Q_1$'s are 75Hz under the A load condition and 90Hz under the B load condition. It shows that the $f_1$ under the B load condition is higher than the $f_1$ under the A load condition.

By rearranging these relationships, the relationship between the condensing temperatures Tc and the operation frequencies is shown in FIG. 5, the relationship being memorized in the memory 62 as data. The data corresponding to the datum operation frequency $f_1$ or $f_2$ is read out from the memory 62 and the switching between the parallel operation and the single operation is effected. Accordingly, the switching is always carried out at the optimum operation efficiency (COP) of the rotary compressor 1, whereby the EER of the air conditioner is much enhanced.

When the rotary compressor 1 is operated as shown in FIG. 10, the motor output torque $T_M$ does not agree with the gas-compression torque (the motor-load torque) $T_L$ as shown in FIG. 11, causing the speed of the rotary system of the rotary compressor 1 to be varied. This results in the generation of vibration in the rotary compressor 1. It is a twin-cylinder type rotary compressor that reduces the gas compression torque $T_L$ by arranging two rollers out of phase by 180°.

The relationships between the rotational angles and the pulsing torques of the twin-cylinder type rotary compressor are shown in FIG. 12 in the parallel operation and shown in FIG. 13 in the single operation. Although the vibration of the twin-cylinder type rotary compressor during the single operation is reduced to a half value of that of the single-cylinder type rotary compressor, it is still more than the vibration during the parallel operation.

As shown In FIG. 11, the gas compression torque $T_L$ which is produced by the compression elements and influences the motor pulses at a period corresponding to one revolution of the rollers. If the output torque $T_M$ is substantially constant, the rollers are accelerated at the location at which the torque difference $(T_L - T_M)$ is positive, and decelerated at the location at which the torque difference is negative. This changes the speed and causes the rotational vibration of the rotary compressor.

In this embodiment, a brushless DC motor is used as the motor 3 by means of which the output torque $T_M$ of the motor is controlled to be made equal to $T_L$, whereby the speed of the rotary system is not varied. This torque control system suppresses the rotational vibration.

Figure 14:
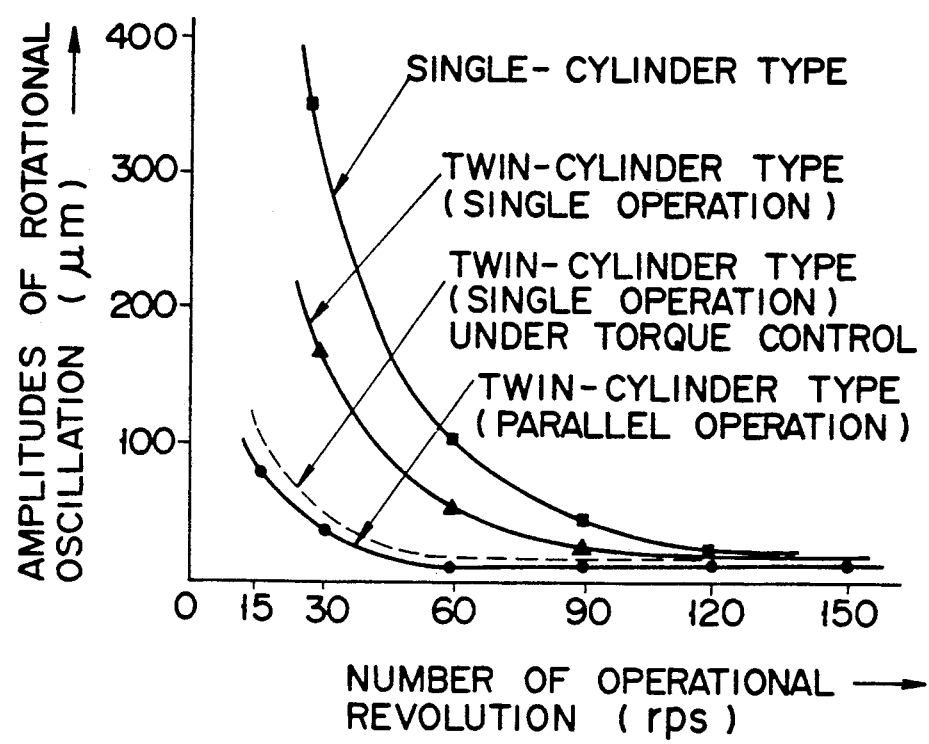

When this torque system is used together with a brushless DC motor, the winding current of the motor is proportional to the torque. Thus, the torque can be controlled by regulating the winding current. During the single operation, the time length of the output pulses which are produced by the inverter circuit 52 at different phases is adjusted, that is, the pulse width modulation (PWM) is conducted, in order to obtain the optimum wave shape of the winding current. The inverter driving circuit 51 receives the selected data from the operation pattern selecting section 46 and then effects the torque control. The winding current of the motor in the single operation is set to a lower one than the winding current in the parallel operation. In consequence, as shown by a broken line in FIG. 14, the vibration characteristic during the single operation is very close to that during the parallel operation.

Figure 15:
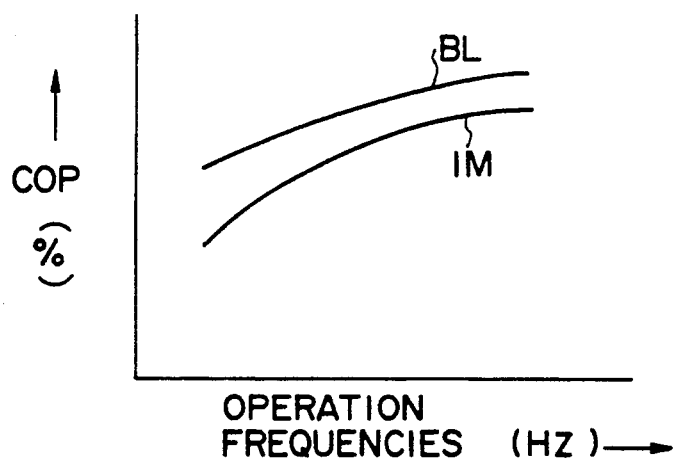
FIGS. 15 and 16 are the efficiencies of the motor of the twin-cylinder rotary compressor of the first embodiment.
Figure 16:
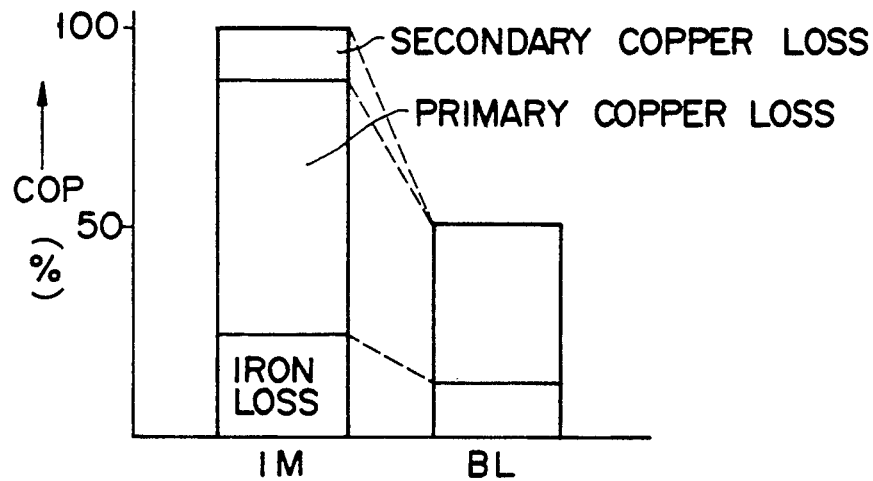

Referring to FIGS. 15 and 16, an induction motor exhibits large copper loss especially in the low frequency region and thus has a lower COP efficiency. On the other hand, a brushless DC motor BM exhibits a total loss including iron loss and copper loss which is half as much as the total loss of the induction motor IM. Further, the efficiency C0P of the brushless DC motor BM is not so much lowered in the low frequency region.

Figure 17:
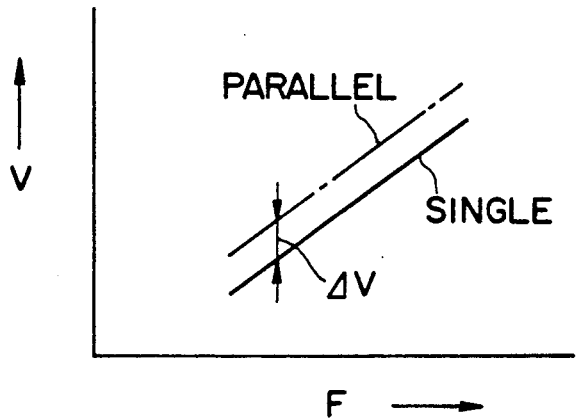
FIG. 17 is a graph showing the V-F characteristics of the outputs of the inverter circuit related to a modification of the first embodiment.

However, an induction motor can be used for this embodiment as the motor 3 of the twin-cylinder type rotary compressor 1 instead of a brushless DC motor. In this case, different voltage-frequency characteristics (V-F characteristics), which are given by the inverter circuit 52 as shown in FIG. 17, are used for the single operation and the parallel operation, respectively. During the single operation, the induction motor is driven at the voltage smaller by $\Delta V$ than at the voltage during the parallel operation.

A second embodiment of this invention will now be explained.

As shown in FIG. 18, a PI control single-operation frequency determining section 72 and a PI control parallel-operation frequency determining section 73 are connected to a temperature difference detecting section 43 via a switching section 71. The frequency determining sections 72 and 73 are connected to a comparison circuit 64 and an inverter driving circuit 51, respectively, and also connected to an initial operation frequency setting section 74 for feeding back signals from the frequency determining sections 72 and 73.

The detected result from the temperature difference detecting section 43 is selectively transmitted by means of the switching section 71 to the P control single-operation frequency determining section 72 or the PI control parallel operation frequency determining section 73. More specifically, the switching section 71 sends the detected result from the temperature difference detecting section 71 to the PI control single-operation frequency determining section 72 when an operation pattern selecting section 46 selects the single operation pattern, and to the PI control parallel-operation frequency determining section 73 when the operation pattern selecting section 46 selects the parallel operation pattern.

The PI control single-operation frequency determining section 72 performs a PI control in accordance with the single-operation characteristic as shown by the solid line in FIG. 4, the characteristic showing the relation between the temperature difference sent from the switching section 71 and the operation frequencies, whereby the operation frequency of the twin-cylinder type rotary compressor 1 is determined. The operation frequency determined by either one of the frequency determining sections 72 and 73 is delivered to the inverter driving circuit 51 and the initial operation frequency setting section 74.

Figure 19:
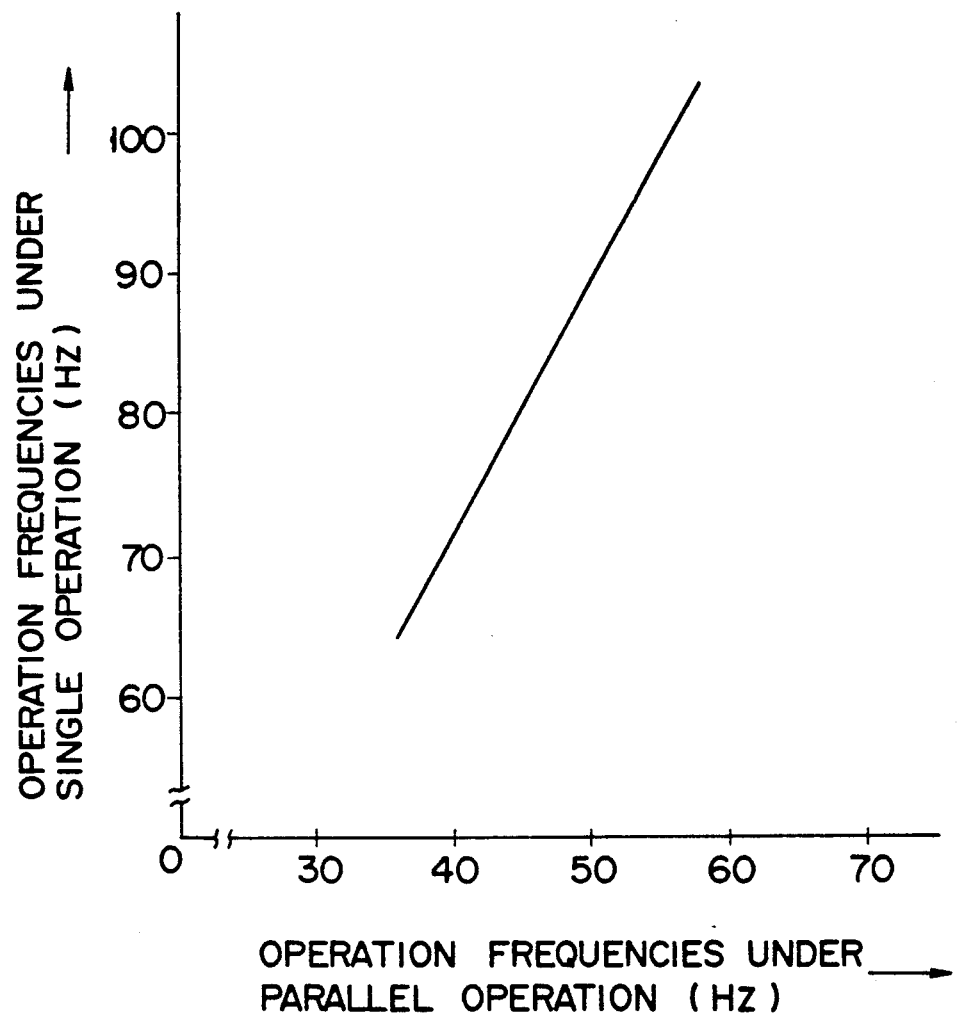
FIG. 19 is a graph depicting the relationship between two kinds of operation frequencies at different modes in the second embodiment.

The initial operation frequency setting section 74 previously memorizes the relationship between the operation frequencies determined by the frequency determining sections 72 and 73 in the form of data as shown in FIG. 19 such that the operation frequencies determined by the frequency determining sections 72 and 73 are initialized due to this data and the input data from the frequency determining sections 72 and 73. This arrangement makes equal to each other the capacitances of the twin-cylinder type rotary compressor 1 in the single operation and the parallel operation at the switching point at which the switching between the single operation and the parallel operation is carried out. FIG. 19 shows the relationship between the operation frequencies during the parallel operation and the single operation at the capacity $Q_1$ at which the COPs in the parallel operation and the single operation are equal to each other.

The other parts and the other structures of the second embodiment are the same as the corresponding parts and structures of the first embodiment.

In the above embodiments, the minimum output frequency from the inverter circuit 51 can be set to be lower than the frequency at the switching point at which the switching between the parallel operation and the single operation is carried out such that the normal operation efficiency COP is made larger than the operation efficiency COP at the switching point. This increases the EER.

The PI control system is applied to the second embodiment in order to determine the operation frequency, but a PID control system can be applied thereto.

This invention has been explained by being applied to an air conditioner. However, this invention is applicable to other equipment employing a twin-cylinder type rotary compressor.

This invention is not limited to the above embodiments, but it is, of course, applicable to various modifications without departing from the scope of this invention.

What is claimed is:

1. A heat exchanger comprising:
   a heat exchanging circuit including: (a) a rotary compressor having first and second compression pumps which employ a single rotating shaft in common, and driving means for driving the first and second compression pumps; (b) a condenser connected to a discharge side of the compression pumps of the rotary compressor; (c) a pressure reducer connected to the condenser; and (d) an evaporator having a first end connected to the pressure reducer and a second end connected to suction ports of the compressor pumps of the rotary compressor;
   an inverter circuit for supplying power to the driving means;
   frequency controlling means for controlling an output frequency of the inverter circuit in accordance with a load applied to the heat exchanging circuit;
   an opening/closing valve, arranged between a suction port of the first compression pump and the evaporator, for controlling the amount of refrigerant flowing into the first compression pump;
   temperature-measuring means for measuring the temperature of the condenser;
   switching frequency-determining means for determining a switching frequency in accordance with the temperature measured by the temperature-measuring means, said switching frequency being used for selecting which operation mode, a single operation mode or a parallel operation mode, is higher in efficiency when the same capacity is to be obtained in accordance with the load applied to the heat exchanging circuit, said single operation mode being a mode wherein the opening/closing valve is kept closed and the refrigerant is prevented from flowing into the first compression pump, thus causing only the second compression pump to operate, and said parallel operation mode being a mode wherein the opening/closing valve is kept open, thus permitting both the first and second compression pumps to operate simultaneously;
   comparison means for comparing the output frequency of the inverter circuit with the switching frequency determined by the switching frequency-determining means; and
   switching means for mode switching between the single operation mode and the parallel operation mode by controlling the opening/closing valve in accordance with results of comparison performed by the comparison means.

2. The heat exchanger according to claim 1, wherein said heat exchange circuit has a DC motor.

3. The heat exchanger according to claim 1, further comprising means for setting voltage-frequency characteristics output from said inverter circuit in correspondence with said single operation and said parallel operation of said compression pumps.

4. The heat exchanger according to claim 1, wherein said frequency controlling means has means for controlling output frequencies of said inverter circuit such that outputs of said two compression pumps in said parallel operation and said one of said two compression pumps in said single operation are made equal when switching between said parallel operation and said single operation is performed.

5. The heat exchanger according to claim 1, wherein said frequency controlling means has means for setting operation frequencies of said compression pumps by means of a PI control.

6. The heat exchanger according to claim 1, wherein said frequency controlling means has means for controlling a minimum value of said output frequency of said inverter circuit so as to set said minimum value to a frequency such that an operation efficiency in said single operation at the frequency is higher than that at a switching frequency at which switching between said parallel operation and said single operation is performed, when said output frequency is lower than said switching frequency.

7. A heat exchanger comprising:
   a heat exchanging circuit including a rotary compressor having two compression pumps and a motor for driving said compression pumps, a condenser connected to said rotary compressor, regulation means connected to said condenser, an evaporator connected to said regulation means;
   an inverter circuit for supplying an electric power to said motor;
   frequency controlling means for controlling an output frequency of said inverter circuit in response to heat loads of said heat exchange circuit such that outputs of two compression pumps in a parallel operation mode and of one compression pump in a single operation mode are made equal when switching between said parallel operation mode and said single operation mode is performed;
   selecting means for selecting a higher one from operation efficiencies of said two compression pumps in parallel operation and of one of said two compression pumps in single operation; and
   switching means for carrying out switching between said parallel operation and said single operation in response to output signals of said selecting means.

8. A heat exchanger comprising:
   a heat exchanging circuit including a rotary compressor having two compression pumps and a motor for driving said compression pumps, a condenser connected to said rotary compressor, regulation means connected to said condenser, an evaporator connected to said regulation means;
   an inverter circuit for supplying electric power to said motor;
   frequency controlling means for controlling an output frequency of said inverter circuit in response to heat loads of said heat exchange circuit, having a means for controlling a minimum value of said output frequency of said inverter circuit so as to set said minimum value to a frequency such that an operation efficiency in a single operation mode at the frequency is higher than that at a switching frequency at which switching between a parallel operation mode and said single operation mode is performed, when said output frequency is lower than said switching frequency;

selecting means for selecting a mode of higher operating efficiency from said parallel operation mode having two compression pumps operating in parallel or said single operation made having one compression pump operating; and switching means for carrying out switching between said parallel operation mode and said single operation mode in response to output signals of said selecting means.

* * * * *